March 21, 1939.  H. S. THOMAS  2,151,247
HORSE-COLLAR PAD
Filed Aug. 9, 1937

INVENTOR.
Harold S. Thomas
BY
ATTORNEYS

Patented Mar. 21, 1939

2,151,247

UNITED STATES PATENT OFFICE 2,151,247

HORSE-COLLAR PAD

Harold Sloane Thomas, Chatham, Ontario, Canada, assignor to The American Pad & Textile Company, Greenfield, Ohio, a corporation of Ohio Application August 9, 1937, Serial No. 158,050

6 Claims. (Cl. 54—65)

This invention relates to a stuffed collar pad for animals, such as the pad commonly used beneath a horse collar as part of harness equipment.

An object of the invention is to provide such a pad which will readily absorb moisture and perspiration without the stuffing becoming bunched or packed after the pad has been in use for a period.

Another object is to provide a pad of this kind which is readily absorbent but quick-drying.

Another object is the provision of an animal pad having the advantages mentioned and at the same time adapted for efficient, low-cost manufacture.

These and other objects are attained by the means described herein and illustrated in the accompanying drawing, in which.

Heretofore, horse collar pads have been of two general classes, one a cheaper grade stuffed with materials of low cost such as pickered jute, second-cut linters, or any other available cheap material having the characteristic of readily absorbing moisture and perspiration. This cheaper grade of pad has had an outstanding disadvantage, namely, the fact that after a period of use the stuffing became hard or packed and bunched. The other class of pad heretofore produced has incorporated a more expensive type of higher grade material of the class having the characteristics of deer hair. Such materials have been recognized as the best type of stuffing since they are light and resilient and do not become packed or bunched after the pad has been in use for some time. The higher cost of the stuffing materials, however, has rendered this type of a pad somewhat unavailable for general use in an article such as a horse collar pad intended for comparatively low consumer cost. Moreover, the higher grade stuffing, while possessing the advantage of moisture absorption, does not dry out so readily as the cheaper type of stuffing.

The present invention obviates both the difficulties described above by providing a pad in which the stuffing consists of two layers, the bottom or facing layer consisting of material such as deer hair, goat hair, kapok, high-grade linters, etc., and the upper layer of stuffing consisting of the cheaper, more available materials. The lower layer of stuffing, in this pad, is adapted to be placed adjacent the neck of the animal, during use, so that moisture and perspiration are readily absorbed. The upper layer, consisting of the cheaper material, is not directly subjected to the moisture but at the same time effects quicker drying of the lower layer of stuffing, performing what may be described as a blotting action. That is, the upper layer absorbs a certain amount of the moisture of the lower layer so that the latter, and consequently the pad as a whole, dries out more quickly. In addition to this, the lower layer of stuffing, having the characteristic of not packing and not losing its shape after use, serves to add this desirable feature to the pad as a whole. Finally, the pad of this invention may be produced at a much lower cost than a pad stuffed entirely with the higher grade materials. The pad of this invention may be produced efficiently due to the simplicity of its construction and has been found to be stronger and more durable than the pad stuffed entirely with the more expensive materials.

Figure 1:
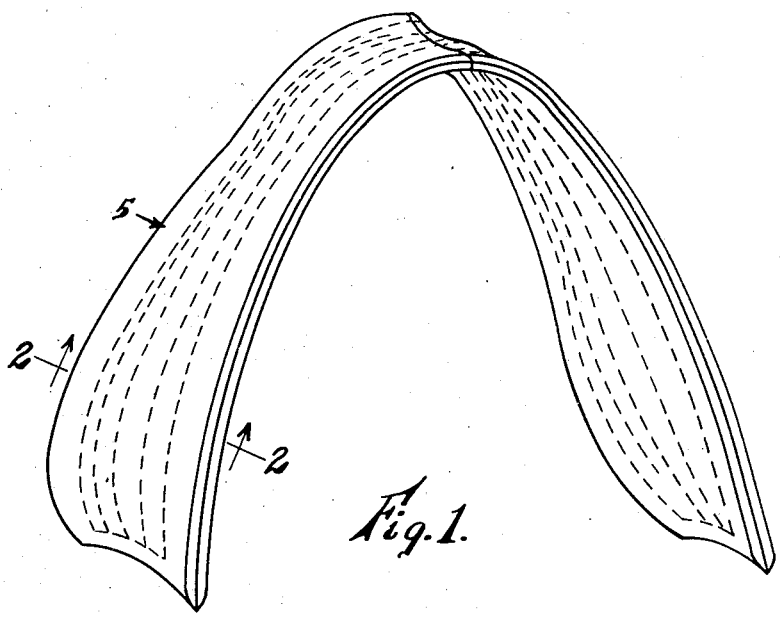
Fig. 1 is a perspective view of a horse collar pad embracing the present invention.
Figure 2:
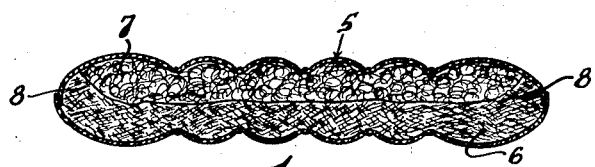
Fig. 2 is an enlarged cross-sectional view taken on line 2—2 of Fig. 1.

With reference to the drawing: the invention contemplates the use of the usual enclosing covering 5 of suitable fabric, stuffed, as shown in Fig. 2, with a substantially flat, longitudinally-extending lower layer 6 of material of the class of deer hair, kapok, etc., and a substantially similar layer 7 of cheaper material, such as jute. The peripheral portions of the lower layer may be continued or turned upwardly as at 8 around the edges of the upper layer for forming the edges of the pad which are, like the facing or lower surface portions of the pad, susceptible to moisture and perspiration on the neck of an animal.

The material of the lower layer 6, being resilient and non-packing, will admit moisture or perspiration within its mass, that is to say, into the spaces between its strands or meshes, but due to the inherent character of materials such as hair, kapok, and the like, the moisture is not actually taken up, to any great extent, by the material itself. Under these circumstances, the denser or more closely packed and more inherently absorbent material of the upper layer 7, lying over and, in use, pressed by the collar against, the lower layer, acts as a blotting medium for the moisture of the lower layer, so that the latter dries out and regains its resiliency more quickly.

It will be observed that the lower layer of material, since it extends throughout the whole of the facing side of the pad, is adapted to retain the shape of the pad after the latter has been used. Inasmuch as the stuffing material does not become bunched, the cover stitching therefore is not subjected to undue strain in some parts nor to the danger of readily tearing or ripping in other parts where the stuffing has become relatively scant. The pad is thereby rendered stronger and more durable and, as already suggested, possesses the desirable characteristics of both the types of stuffing heretofore separately used without, at the same time, incorporating the disadvantages of the older types of pads.

What is claimed is:

1. A horse collar pad or the like comprising a cover enclosing two layers of stuffing: a bottom or facing layer consisting of light, resilient material, and an upper layer of denser, more inherently absorbent material.

2. A horse collar pad or the like comprising a cover enclosing two layers of stuffing: a bottom or facing layer consisting of light, resilient material of the class of hair or kapok, and an upper layer of denser, more inherently absorbent material of the class of jute.

3. A horse collar pad comprising a cover enclosing a bottom or facing layer of non-compacting stuffing, and an upper layer of stuffing of material more inherently absorbent than that of the bottom layer.

4. A horse collar pad comprising a cover enclosing a bottom or facing layer of non-compacting stuffing, and an upper layer of stuffing of material more inherently absorbent than that of the bottom layer, said bottom layer being turned or continued upwardly at the periphery for embracing the edges of said upper layer and for forming the edge portions of the pad.

5. A collar pad comprising a cover enclosing a bottom or facing layer of resilient stuffing material, and means in the cover above said facing layer for blotting or absorbing moisture taken into said facing layer.

6. A horse collar pad comprising a cover enclosing a bottom or facing layer of resilient stuffing material of the class of hair or kapok, and an upper layer of more inherently absorbent material of the class of jute, disposed directly upon said facing layer and adapted to absorb or blot perspiration or moisture entering said facing layer.

HAROLD SLOANE THOMAS.